(12) United States Patent
Li et al.

(10) Patent No.: US 12,281,183 B2
(45) Date of Patent: Apr. 22, 2025

(54) METHODS FOR EXTRACTING XYLOSE LIQUID AND CELLULOSE WITH HIGH PURITY FROM CORN STRAW

(71) Applicant: ZHEJIANG HUAKANG PHARMACEUTICAL CO., LTD., Zhejiang (CN)

(72) Inventors: Mian Li, Quzhou (CN); Changhui Hu, Quzhou (CN); Liangcong Yan, Quzhou (CN); Jiaxing Luo, Quzhou (CN); Wulong Yang, Quzhou (CN); Weidong Xu, Quzhou (CN); Qiang Wu, Quzhou (CN)

(73) Assignee: ZHEJIANG HUAKANG PHARMACEUTICAL CO., LTD., Quzhou (CN)

( * ) Notice: Subject to any disclaimer, the term of this patent is extended or adjusted under 35 U.S.C. 154(b) by 0 days.

(21) Appl. No.: 18/651,620

(22) Filed: Apr. 30, 2024

(65) Prior Publication Data

US 2024/0301094 A1    Sep. 12, 2024

Related U.S. Application Data

(63) Continuation-in-part of application No. PCT/CN2023/096365, filed on May 25, 2023.

(30) Foreign Application Priority Data

Dec. 8, 2022    (CN) .......................... 202211575495.1

(51) Int. Cl.
C08B 37/14    (2006.01)
C08L 1/02     (2006.01)

(52) U.S. Cl.
CPC .............. *C08B 37/143* (2013.01); *C08L 1/02* (2013.01)

(58) Field of Classification Search
CPC ...... C08B 37/143; C13K 1/02; C13K 13/002; D21C 3/02
See application file for complete search history.

(56) References Cited

FOREIGN PATENT DOCUMENTS

| CN | 101851295 A | 10/2010 |
| CN | 101851801 A | 10/2010 |
| CN | 102776244 A | 11/2012 |
| CN | 106223095 A | 12/2016 |
| CN | 106632581 A | 5/2017 |
| CN | 106638089 A | 5/2017 |
| CN | 111363096 A | 7/2020 |
| CN | 114262352 A | 4/2022 |
| CN | 115852723 A | 3/2023 |
| GB | 474188 A | 10/1937 |

OTHER PUBLICATIONS

International Search Report in PCT/CN2023/096365 mailed on Aug. 29, 2023, 6 pages.
Written Opinion in PCT/CN2023/096365 mailed on Aug. 29, 2023, 8 pages.
First Office Action in Chinese Application No. 202211575495.1 mailed on Sep. 16, 2023, 12 pages.
Notification to Grant Patent Right for Invention in Chinese Application No. 202211575495.1 mailed on Feb. 5, 2024, 4 pages.

*Primary Examiner* — Eric Olson
*Assistant Examiner* — Samuel L Galster
(74) *Attorney, Agent, or Firm* — METIS IP LLC

(57) ABSTRACT

The embodiments of the present disclosure provide a method for extracting xylose liquid and cellulose with high purity from corn straw. The method includes raw material screening, raw material preprocessing, alkali processing, acid hydrolysis, and gradient alkali processing. The embodiments of the present disclosure adopt a gradient selective refining method for extracting a high-purity xylose liquid and cellulose from the corn straw, so as to maximize the extraction of the xylose from the corn straw, and at the same time, to separate and extract a high-purity cellulose product from straw residue under a low-cost process processing.

5 Claims, No Drawings

METHODS FOR EXTRACTING XYLOSE LIQUID AND CELLULOSE WITH HIGH PURITY FROM CORN STRAW

CROSS-REFERENCE TO RELATED APPLICATION

This application is a continuation-in-part of international application No. PCT/CN2023/096365, filed on May 25, 2023, which claims priority to Chinese patent application No. 202211575495.1, filed on Dec. 8, 2022, the entire contents of each of which are hereby incorporated by reference.

TECHNICAL FIELD

The present disclosure relates to the technical field of cellulose preparation, and in particular to a method for extracting xylose liquid and cellulose with high purity from corn straw.

BACKGROUND

There are abundant sources of lignocellulosic raw materials, including agricultural residues, forest crops, and industrial residues, etc. Corn straw is one of the agricultural residues, which is abundant, cheap, safe, and renewable, and can be used as an alternative to fossil energy. The three major components, namely, cellulose, hemicellulose, and lignin in a straw biomass raw material may be converted into many forms of high-value chemicals, thereby reducing environmental problems, and contributing to the development of economy and society. However, the components in the corn straw are tightly connected and not easy to be separated and purified for further high-value conversion, and at present, most straw biomass is directly burned or discarded. Therefore, there is an urgent need for designing a suitable straw processing method to improve the utilization rate of straw raw materials.

Therefore, it is desirable to develop a method for extracting xylose liquid and cellulose with high purity from the corn straw.

SUMMARY

Embodiments of the present disclosure provide a method for extracting xylose liquid and cellulose with high purity from corn straw, including the following steps:

step 1, raw material screening including: selecting corn straw with a moisture content of 7%-13%;

step 2, raw material preprocessing including: processing the corn straw into powder using a pulverizer, a particle size of the powder being between 60 mesh and 300 mesh, and then putting the powder into a blower drying box and drying at 45° C. for 22 h-26 h to obtain absolutely dry powdered corn straw;

step 3, alkali processing including: after mixing the absolutely dry powdered corn straw with process water, adding 30% concentrated alkali liquid and adjusting a concentration of NaOH in the system to 0.1%-0.4%, performing the alkali processing for 1.2 h-2.0 h under a temperature of 85° C.-125° C., then obtaining straw residue and a centrifugal clear liquid by centrifugal separation, wherein the straw residue enters a xylose extraction process;

step 4, acid hydrolysis including: mixing the straw residue with a 1.0%-2.5% dilute $H_2SO_4$ solution in a certain proportion, performing an acid hydrolysis at 100° C.-160° C. for 30 min-120 min, and then performing a centrifugation to obtain an acid hydrolyzed liquid and acid hydrolyzed straw residue, wherein the acid hydrolyzed liquid is a high-purity xylose liquid, and the acid hydrolyzed straw residue enters a following cellulose extraction process; and step 5, gradient alkali processing including: after mixing the hydrolyzed straw residue and the process water, adding 30% concentrated alkali liquid and adjusting a concentration of NaOH in the system to 0.2%-1%, performing preprocessing continuously for 4.0 h-7.0 h, wherein an initial temperature is 60° C.-90° C., then for every 1 hour, increasing the concentration of NaOH by 0.1%-0.5% and increasing the temperature by 10° C.-20° C., after separating the treated material by centrifugation, washing a solid portion to obtain a high cellulose content product.

In some embodiments, in the step 1, a content of the cellulose in components of the corn straw is 36%-41%, a content of hemicellulose in the components of the corn straw is 19%-24%, and a content of lignin and other substances in the components of the corn straw is 35%-45%.

In some embodiments, in the step 3, for every 100 g of the absolutely dry powdered corn straw after the alkali processing, 83.40 g straw residue is obtained, wherein the straw residue contains 36.98 g cellulose, 18.78 g hemicellulose, and 27.64 g lignin and other substances.

In some embodiments, in the step 4, for every 100 g of the absolutely dry powdered corn straw after the acid hydrolysis, 53.11 g of the acid hydrolyzed straw residue and 1.53 L of xylose hydrolysate is obtained, wherein the acid hydrolyzed straw residue contains 34.32 g of cellulose, 18.79 g of lignin and other substances, and a concentration of the xylose in the xylose hydrolysate is 11.84 g/L.

In some embodiments, in the step 5, for every 100 g of the absolutely dry powdered corn straw, 27.37 g of high-purity cellulose is obtained by the gradient alkali processing.

DETAILED DESCRIPTION

In order to make the technical problem to be solved, the technical solution and the beneficial effect of the present disclosure clearer and more understandable, the following combines the embodiments to further describe the present disclosure in detail. It may be understood that the specific embodiments described herein are only for explaining the present disclosure, and are not intended to limit the present disclosure.

At present, for the processing of corn straw, a mainstream practice may be to first hydrolyze or enzymatically hydrolyze a hemicellulose component in the corn straw with an acid solution or a xylanase to obtain a xylose. A residue may then be processed with a cellulase to obtain a cellulose enzymatically hydrolyzed glucose solution, and the obtained glucose solution may be fermented into an ethanol product. However, contents of the xylose and cellulose obtained by the above practice may be relatively low, and a cost of the enzyme may be high.

Embodiments of the present disclosure provide a method for extracting xylose liquid and cellulose with high purity from the corn straw, including the following steps.

In step 1, a raw material is screened. Specifically, corn straw with a moisture content of 7%-13% is selected.

In some embodiments, the moisture content of the corn straw selected in step 1 may be 7%-13%. In some embodiments, the moisture content of the corn straw raw material selected in step 1 may further be 7%, 10%, or 13%.

In some embodiments, in step 1, a content of cellulose (also referred to as cellulose content) in components of the corn straw may be 36%-41%, a content of hemicellulose (also referred to as hemicellulose content) in components of the corn straw may be 19%-24%, and a content of lignin and other substances in components of the corn straw may be 35%-45%.

In step 2, the raw material is preprocessed. Specifically, the corn straw is processed into powder using a pulverizer, wherein a particle size of the powder is between 60 mesh and 300 mesh. Then the powder is put into a blower drying box and dried at 45° C. for 22 h-26 h, and the powder becomes absolutely dry powdered corn straw.

The raw material preprocessing refers to a process in which the corn straw is processed into powder using the pulverizer, and then dried to obtain the absolutely dry powdered corn straw.

The absolutely dry powdered corn straw refers to the powdered corn straw with a moisture content of less than 0.5%.

In step 3, the alkali processing is performed and includes: after mixing the absolutely dry powdered corn straw with process water in a certain proportion, adding 30% concentrated alkali liquid and adjusting a concentration of NaOH (also referred to as NaOH concentration) in the system to 0.1%-0.4%, performing the alkali processing for 1.2 h-2.0 h under a temperature of 85° C.-125°, then obtaining straw residue and a centrifugal clear liquid by centrifugal separation, wherein the straw residue enters a xylose extraction process.

The alkali processing refers to the preprocessing of the corn straw using a dilute alkali solution. The alkali processing can remove impurities such as easily hydrolyzed lignin and colloids in plant cell walls in the corn straw, and basically retain the xylose unit component in the hemicellulose of the corn straw.

In some embodiments, after adding 30% concentrated alkali liquid, the NaOH concentration may be 0.1%-0.4%. In some embodiments, after adding 30% concentrated alkali liquid, the NaOH concentration may be 0.1% or 0.4%, or preferably 0.1%.

In some embodiments, the corn straw may be subject to the alkali processing at a temperature between 85° C.-125° C. In some embodiments, the corn straw may be subject to the alkali processing at a temperature of 85° C. or 122° C., or preferably 125° C.

In some embodiments, the processing time for the alkali processing of the corn straw may be 1.2 h-2.0 h. In some embodiments, the processing time for the alkali processing of the corn straw may be 1.5 h or 2 h, or preferably 1.2 h.

In some embodiments, after every 100 g of corn straw being treated with alkali, 80.75 g of residual solids may be obtained, of which a xylose loss rate is less than 5% and a cellulose loss rate is less than 4%.

In some embodiments, in step 3, after every 100 g of the absolutely dry powdered corn straw is treated with alkali, 83.40 g straw residue may be obtained. The straw residue may contain 36.98 g cellulose, 18.78 g hemicellulose, and 27.64 g lignin and other substances.

In step 4, the acid hydrolysis is performed and includes: mixing the straw residue with a 1.0%-2.5% dilute $H_2SO_4$ solution in a certain proportion, performing an acid hydrolysis at 100° C.-160° C. for 30 min-120 min, and then performing a centrifugation to obtain an acid hydrolyzed liquid and acid hydrolyzed straw residue. The acid hydrolyzed liquid may enter the xylose extraction process to prepare xylose. The acid hydrolyzed liquid is a high-purity xylose liquid, and the acid hydrolyzed straw residue may enter a following cellulose extraction process.

The acid hydrolysis refers to performing a dilute sulfuric acid hydrolysis on the absolutely dry powdered corn straw after the dilute alkali processing to hydrolyze the hemicellulose in the corn straw into xylose, and at the same time to obtain a hydrolysis liquid which is relatively clarified, with fewer impurities, and easy to separate out the xylose.

In some embodiments, when performing the dilute sulfuric acid hydrolysis on the corn straw after the dilute alkali processing, the concentration of the dilute sulfuric acid may be 1.0%-2.5%. In some embodiments, the concentration of the dilute sulfuric acid may be 1.0%, 1.6%, or 2.5%, or preferably 2.49%.

In some embodiments, the dilute sulfuric acid hydrolysis on the corn straw after the dilute alkali processing may be performed at a temperature of 100° C.-160° C. In some embodiments, the dilute sulfuric acid hydrolysis on the corn straw after the dilute alkali processing may be performed at a temperature of 100° C., 110° C., or 160° C., or preferably 124.8° C.

In some embodiments, when performing the dilute sulfuric acid hydrolysis on the corn straw after the dilute alkali processing, the processing time may be 30 min-120 min. In some embodiments, the processing time may be 30 min or 120 min, or preferably 94.8 min.

In some embodiments, for every 100 g of the corn straw, after steps 2, 3, and 4, 53.11 g of the acid hydrolyzed straw residue and 1.53 L of the xylose hydrolysate may be obtained. The acid hydrolyzed straw residue may contain 34.32 g of cellulose, 18.79 g of lignin and other substances, and the xylose hydrolysate may have a concentration of xylose of 11.84 g/L, with a purity of 74.14%.

In step 5, a gradient alkali processing is performed and includes after mixing the acid hydrolyzed straw residue and the process water in a certain proportion, adding 30% concentrated alkali liquid and adjusting a concentration of NaOH in the system to 0.2%-1%, performing preprocessing continuously for 4.0 h-7.0 h, wherein an initial temperature may be 60° C.-90° C.; then for every 1 hour, increasing the concentration of NaOH by 0.1%-0.5% and increasing the temperature by 10° C.-20° C.; after separating the treated material by centrifugation, washing a solid portion to obtain a high cellulose content product.

The gradient alkali processing refers that after mixing the straw residue obtained after the alkali-acid processing with the process water, further process the straw residue in a concentrated alkali liquid conditioning system in which the concentration of the alkali solution and the temperature of the alkali solution gradually increase. The gradient alkali processing of the acid hydrolyzed straw residue may remove the lignin and other components in the acid hydrolyzed straw residue, and improve the content of the cellulose in the straw residue.

In some embodiments, when performing the gradient alkali processing on the straw residue obtained by the alkali-acid processing, after adding 30% concentrated alkali liquid, the concentration of NaOH may be 0.2%-1%. In some embodiments, when performing the gradient alkali processing on the straw residue obtained by the alkali-acid processing, after adding 30% concentrated alkali liquid, the concentration of NaOH may be 0.2%, 0.3%, 0.4%, 0.5%, or 1%, or preferably 0.4%.

In some embodiments, when performing the gradient alkali processing on the straw residue obtained by the alkali-acid processing, an initial reaction temperature may be 60° C.-90° C. In some embodiments, when performing the gradient alkali processing on the straw residue obtained by the alkali-acid processing, the initial reaction temperature may be 60° C., 70° C., 80° C., or 90° C., or preferably 90° C.

In some embodiments, when performing the gradient alkali processing on the straw residue obtained by the alkali-acid processing, a duration of the continuous preprocessing may be 4.0 h-7.0 h. In some embodiments, when performing the gradient alkali processing on the straw residue obtained by the alkali-acid processing, the duration of the continuous preprocessing may be 4 h, 5 h, 6 h, or 7 h, or preferably 6 h.

In some embodiments, after every 100 g of the absolutely dry powdered corn straw being processed in the above steps, 27.37 g of high-purity cellulose (97.49%) may be obtained.

Beneficial effects of the embodiments of the present disclosure may include, but are not limited to: (1) by adopting 0.1%-0.4% dilute alkali solution to preprocess the absolutely dry powdered corn straw to remove impurities such as easily hydrolyzed lignin and colloids in the plant cell walls in the corn straw, thereby basically retaining the xylose component in the hemicellulose in the corn straw; (2) by performing the dilute acid hydrolysis on the dilute alkali processed absolutely dry powdered corn straw to hydrolyze the hemicellulose in the corn straw into the xylose (with a conversion rate of 77.4%), and at the same time, obtain a relatively clarified hydrolysate with fewer impurities and easy to separate the xylose, wherein the dilute alkali processing and the dilute acid processing are in one step and do not require multi-level treatment, which simplifies the process, and the concentration of the dilute alkali used may be only 0.1% (mass fraction), and the concentration of the dilute $H_2SO_4$ may be 2.49% (mass fraction); (3) by further performing the alkali processing on the acid hydrolyzed straw residue (with the cellulose content of 63.39%, the hemicellulose content of 0%, the lignin and other components content of 36.61%), and gradiently increasing in the concentration of the alkali solution and the temperature of the alkali solution to remove the lignin and other components in the acid hydrolyzed straw residue, thereby increasing the cellulose content in the straw residue, and ultimately, a high-purity cellulose product with a cellulose content of 97.96% may be obtained after the alkali processing. By adopting the mode of gradiently increasing in the concentration of the alkali solution and the temperature of the alkali solution, a purer cellulose product may be obtained.

The method for extracting xylose liquid and cellulose with high purity from corn straw is further described below by specific embodiments. Obviously, the following embodiments are only a portion of the embodiments of the present disclosure and not all of them. Based on the embodiments in the present disclosure, all other embodiments obtained by those skilled in the art without making creative labor fall within the scope of protection of the present disclosure.

EMBODIMENTS

Embodiment 1: Alkali processing

In this embodiment, a four-factor, three-level response surface model optimization experiment was designed, and a total of 29 groups of experiments were carried out. Through the response surface model optimization and three batches of validation, it was found that in the optimal experimental group, a cellulose retention rate was 95.53%, a hemicellulose retention rate was 91.57%, and a lignin and other components removal rate was 32.22%. An optimal condition for the alkali processing was: under a 0.1% concentration of NaOH solution and a 1:6 solid-liquid rate, keeping the temperature at 125° C. for 1.2 h. A composition of the straw residue under the optimal condition for the alkali processing is shown in Table 1. Under this optimal condition, theoretically, for every 100 g of the absolutely dry powdered corn straw (containing about 38.71 g of cellulose, 20.51 g of hemicellulose, and 40.78 g of lignin and others) processed with the alkali, 83.40 g of straw residue was obtained, which contained about 36.98 g of cellulose, 18.78 g of hemicellulose, and 27.64 g of lignin and others. The composition of the straw residue under the optimal condition for the alkali processing is shown in Table 1 as follows.

TABLE 1

Composition of straw residue under the optimal condition for the alkali processing

| Straw residue | Cellulose | Hemicellulose | Lignin and others |
|---|---|---|---|
| Proportion | 44.34% | 22.52% | 33.14% |

Embodiment 2: Acid Hydrolysis

This embodiment was performed in a total of 29 groups of experiments, specific experimental programs and experimental results are shown in Table 3. Through the response surface model optimization and three batches of validation, it was found that in the optimal experimental group, a xylose yield was 84.51%, a cellulose retention rate was 92.80%, a hemicellulose retention rate was 0%, and a removal rate of the lignin and others was 32.01%. The optimal condition for the acid hydrolysis was: under a 2.49% concentration of $H_2SO_4$ solution and a 1:12 solid-liquid rate, keeping the temperature at 124.8° C. for 94.8 min. A composition of the acid hydrolyzed straw residue under the optimal condition for the acid hydrolysis is shown in Table 2. Under this optimal condition, theoretically, for every 100 g of the absolutely dry powdered corn straw (containing about 38.71 g of cellulose, 20.51 g of hemicellulose, and 40.78 g of lignin and others), after the first dilute alkali processing followed by the dilute acid hydrolysis, 53.11 g of acid hydrolyzed straw residue was obtained, which contained about 34.32 g of cellulose and 18.79 g of lignin and others.

TABLE 2

Composition of acid hydrolyzed straw residue under the optimal condition for the acid hydrolysis

| Acid hydrolyzed straw residue | Cellulose | Hemicellulose | Lignin and others |
|---|---|---|---|
| Proportion | 64.42% | 0% | 35.38% |

TABLE 3

Optimization of the acid hydrolysis experiment programs and experiment results by response surface methodology

| Std | Run | Acid usage(%) | Temperature (° C.) | Time (h) | Solid-liquid rate | Hemicellulose content (%) | Cellulose retain rate (%) | Xylose yield (%) |
|---|---|---|---|---|---|---|---|---|
| 24 | 1 | 1.75 | 125 | 2 | 12 | 0.94 | 99.86 | 69.78 |
| 29 | 2 | 1.75 | 105 | 2 | 10 | 7.42 | 96.9 | 58.13 |
| 10 | 3 | 2.5 | 105 | 2 | 8 | 5.82 | 97.92 | 62.26 |
| 22 | 4 | 1.75 | 125 | 2 | 8 | 1.2 | 97.57 | 72.83 |
| 7 | 5 | 1.75 | 105 | 1.5 | 12 | 5.96 | 98.88 | 57.41 |
| 23 | 6 | 1.75 | 85 | 2 | 12 | 14.56 | 98.09 | 7.22 |
| 25 | 7 | 1.75 | 105 | 2 | 10 | 7.2 | 98.46 | 60.18 |
| 21 | 8 | 1.75 | 85 | 2 | 8 | 14.71 | 98.76 | 5.65 |
| 28 | 9 | 1.75 | 105 | 2 | 10 | 7.03 | 98.58 | 60.56 |
| 5 | 10 | 1.75 | 105 | 1.5 | 8 | 6.78 | 95.06 | 52.45 |
| 4 | 11 | 2.5 | 125 | 2 | 10 | 0 | 98.08 | 72.7 |
| 14 | 12 | 1.75 | 125 | 105 | 10 | 1.11 | 96.23 | 74.94 |
| 26 | 13 | 1.75 | 105 | 2 | 10 | 7.07 | 97.41 | 60.56 |
| 8 | 14 | 1.75 | 105 | 2.5 | 12 | 5.31 | 100 | 66.9 |
| 9 | 15 | 1 | 105 | 2 | 8 | 9.8 | 95.68 | 32.62 |
| 15 | 16 | 1.75 | 85 | 2.5 | 10 | 13.89 | 100 | 6.22 |
| 16 | 17 | 1.75 | 125 | 2.5 | 10 | 1.24 | 95.77 | 66.15 |
| 18 | 18 | 2.5 | 105 | 1.5 | 10 | 4.31 | 97.03 | 63.99 |
| 3 | 19 | 1 | 125 | 2 | 10 | 1.98 | 99.3 | 74.32 |
| 12 | 20 | 2.5 | 105 | 2 | 12 | 5.04 | 97.72 | 68.77 |
| 13 | 21 | 1.75 | 85 | 1.5 | 10 | 12.74 | 95.56 | 4.78 |
| 2 | 22 | 2.5 | 85 | 2 | 10 | 13.58 | 100 | 11.51 |
| 6 | 23 | 1.75 | 105 | 2.5 | 8 | 5.66 | 96.42 | 62.04 |
| 27 | 24 | 1.75 | 105 | 2 | 10 | 7.17 | 98.24 | 59.96 |
| 17 | 25 | 1 | 105 | 1.5 | 10 | 8.95 | 95.26 | 28.65 |
| 20 | 26 | 2.5 | 105 | 2.5 | 10 | 3.99 | 97.14 | 70.71 |
| 11 | 27 | 1 | 105 | 2 | 12 | 8.27 | 93.06 | 42.68 |
| 1 | 28 | 1 | 85 | 2 | 10 | 16.18 | 98.48 | 3.74 |
| 19 | 29 | 1 | 105 | 2.5 | 10 | 8.45 | 100 | 45.57 |

Embodiment 3: Comparison Between the Xylose Hydrolysate Obtained by Directly Performing the Acid Processing on the Corn Straw and the Xylose Hydrolysate Obtained by Performing the Alkali Processing-Acid Hydrolysis on the Corn Straw A xylose hydrolysate 1 was obtained by hydrolysis through the optimal processing condition of Embodiments 1-2, and a xylose hydrolysate 2 was obtained by the direct acid processing. The xylose hydrolysate 1 and the xylose hydrolysate 2 were subjected to a liquid-phase test for xylose purity: the xylose purity of the xylose hydrolysate 1 was 74.14%, and the xylose purity of the xylose hydrolysate 2 was 62.16%.

Embodiment 4: Extraction of High-Purity Cellulose by Further Gradient Alkali Processing on the Straw Residue Obtained from the Alkali-Acid Processing In this embodiment, the acid hydrolyzed straw residue (with cellulose content of 64.62%, hemicellulose content of 0%, lignin and other substance contents of 35.38%) was further subjected to the alkali processing to remove the lignin and other components in the acid hydrolyzed straw residue, and to increase the content of the cellulose in the straw residue.

(1) Effect of an Initial Alkali Dosage on Increasing the Cellulose Content in the Acid Hydrolyzed Straw Residue Preprocessing condition: a proportion of the acid hydrolyzed straw residue to purified water was 1:8, the initial reaction temperature was 90° C., the temperature was increased by 20° C. per hour, 0.5% concentration NaOH was added, and a reaction time was 4 h. The effect of an initial dosage of NaOH on the increasing of cellulose content in the acid hydrolyzed straw residue was examined. The initial NaOH concentrations were 0.2%, 0.3%, 0.4% and 0.5%, respectively. The corresponding results are shown in Table 4.

TABLE 4

Effect of alkali dosage on the increasing of cellulose content in acid hydrolyzed straw residue

| Initial system NaOH concentration | Cellulose content (%) | Cellulose retention rate (%) | Residue yield (%) |
|---|---|---|---|
| 0.2% | 85.38 | 78.12 | 58.00 |
| 0.3% | 89.97 | 70.97 | 50.00 |
| 0.4% | 89.87 | 68.41 | 48.25 |
| 0.5% | 88.74 | 65.45 | 46.75 |

From Table 4, it can be seen that when the proportion of the initial NaOH concentration is increased from 0.2% to 0.4%, the cellulose content in the remaining residue is 89.97%, which is basically the maximum, and at this time, the cellulose retention rate is 70.97%.

(2) Effect of the Initial Reaction Temperature on Increasing the Cellulose Content in the Acid Hydrolyzed Straw Residue Preprocessing condition: the proportion of the acid hydrolyzed straw residue to the purified water was 1:9, the initial NaOH concentration was 0.4%, the temperature was increased by 20° C. per hour, 0.5% concentration of NaOH was added, and the reaction time was 4 h. The effect of the initial temperature on the increasing of the cellulose content in the acid hydrolyzed straw residue was examined. The reaction temperatures were 60° C., 70° C., 80° C. and 90° C., respectively. The corresponding results are shown in Table 5.

TABLE 5

Effect of the initial reaction temperature on the increasing of the cellulose content in the acid hydrolyzed straw

| Reaction temperature (° C.) | Cellulose content (%) | Cellulose retention (%) | Residue yield (%) |
| --- | --- | --- | --- |
| 60 | 80.38 | 89.08 | 70.25 |
| 70 | 89.7 | 70.97 | 50.00 |
| 80 | 88.05 | 68.76 | 49.50 |
| 90 | 91.10 | 66.83 | 46.50 |

From Table 5, it can be seen that the cellulose content basically shows an increasing trend when the reaction temperature is increased from 60° C. to 90° C. When the initial reaction temperature is 90° C., the cellulose content in the remaining residue reaches the maximum of 91.10%, and at this time, the cellulose retention rate is 66.83%.

(3) Effect of the Reaction Time on the Increasing the Cellulose Content in the Acid Hydrolyzed Straw Residue Preprocessing condition: the proportion of the acid hydrolyzed straw residue to the purified water was 1:12, the initial NaOH concentration was 0.4%, the initial temperature was 90° C., the temperature was increased by 20° C. per hour, and 0.5% concentration NaOH was added. The effect of the reaction time on the increasing of the cellulose content in the acid hydrolyzed straw was examined. The reaction time were 4 h, 5 h, 6 h and 7 h, respectively. The corresponding results are shown in Table 6.

TABLE 6

Effect of reaction time on increasing cellulose content in acid hydrolyzed straw residue

| Reaction time (h) | Cellulose content (%) | Cellulose retention (%) | Residue yield (%) |
| --- | --- | --- | --- |
| 4 | 91.10 | 66.83 | 46.50 |
| 5 | 96.08 | 66.69 | 44.00 |
| 6 | 97.63 | 66.23 | 43.00 |
| 7 | 96.93 | 63.08 | 41.25 |

From Table 6, it can be seen that the cellulose content basically shows an increasing trend when the reaction time increases from 4 h to 6 h. When the reaction time is 6 h, the cellulose content in the acid hydrolyzed straw residue reaches the maximum of 97.63%, and at this time, the cellulose retention rate is 66.23%.

Embodiment 5 Extraction of High-Purity Xylose Hydrolysate and Cellulose Products (Small Scale) from the Corn Straw Step 1-1, the raw material screening was performed and included selecting corn straw with a moisture content of 7%.

Step 1-2, the raw material preprocessing was performed and included crushing the corn straw using a pulverizer, selecting particles with a particle size of 60-300 mesh using a sieve, and putting the particles in a blower drying box, and drying at 45° C. for 22 h. As a result, by measuring the moisture, absolutely dry powdered corn straw with a moisture content of 0.5% or less was obtained.

Step 1-3, the alkali processing was performed and included weighing 100 g of the absolutely dry powdered corn straw, mixing the absolutely dry powdered corn straw with 600 g process water, adding the 30% concentrated NaOH solution into the mixture, adjusting the system NaOH concentration to 0.1%, packing with a sealed blue-capped bottle, and placing the sealed blue-capped bottle in a sterilizer, then heating to 125° C. and keeping for 2 h. After heating, the material was cooled and centrifuged to separate the solid and liquid phases. The solid portion was washed using 1 L of clean water, and the solid and liquid phases were further separated by centrifugation. After washing twice, the wet weight of the obtained straw residue was 333.6 g (82.27 g dry basis). The dry basis compositions were tested, which contained about 35.98 g of cellulose, 18.98 g of hemicellulose, and 27.31 g of lignin and others.

Step 1-4, the acid hydrolysis was performed and included adding the straw residue into 736 g of $H_2SO_4$ solution with 2.5% concentration, packing with a sealed blue-capped bottle, and placing the sealed blue-capped bottle in a sterilizer, then heating to 100° C. for 30 min. After heating, the material was cooled and centrifuged to separate the solid and liquid phases. The weight of the liquid portion was 910 g. After the HPLC test, the xylose concentration was 12.56 g/L, and the purity was 75.23%. The solid portion was washed using 1 L of clean water, and the centrifugation was continued to separate the solid and liquid phases. After washing twice, the wet weight of the obtained acid hydrolyzed straw residue was 183.78 g (52.01 g dry basis), which contained 34.77 g of cellulose and 17.24 g of lignin and others according to the composition test.

Step 1-5, the gradient alkali processing was performed and included adding the acid hydrolyzed straw residue into 225 g process water, adding the 30% concentrated alkali liquid into the mixture, adjusting the initial concentration of NaOH in the system to 0.2%, packing with a sealed blue-capped bottle, placing the sealed blue-capped bottle in a sand bath to keep warm and heat, setting the initial temperature to 60° C., heating and warm-keeping for 1 h, and adding 30% alkali liquid in the blue-capped bottle to make the system NaOH concentration increased by 0.5%, rising the temperature by 10° C., according to this pattern, for every 1 h, increasing the system NaOH concentration by 0.5%, increasing the temperature by 20° C., wherein a total reaction time was 4 h. After heating, the sample was cooled and centrifuged to separate the solid and liquid phases. The solid portion was washed using 1 L of water for three times, and then dried in an oven at 65° C. for 20 h, after that, 27.19 g of dried finished product was obtained and tested, in which the purity of the cellulose was 96.93%.

Embodiment 6 Extraction of High-Purity Xylose Hydrolysate and Cellulose Products from the Corn Straw Step 2-1, the raw material screening was performed and included selecting corn straw with a moisture content of 13%.

Step 2-2, the raw material preprocessing was performed and included crushing the corn straw using a pulverizer, selecting particles with a particle size of 60-300 mesh using a sieve, and putting the particles in a blower drying box, and drying at 45° C. for 26 h. As a result, by measuring the moisture, absolutely dry powdered corn straw with a moisture content of 0.5% or less was obtained.

Step 2-3, the alkali processing was performed and included weighing 10 kg of the absolutely dry powdered corn straw, mixing the absolutely dry powdered corn straw with 60 kg process water, adding 30% concentrated alkali liquid, adjusting the NaOH concentration of the system to 0.4%, mixing well, then placing the solution in a pressure reactor (which is acid and alkali resistant), heating to 85° C.

and keeping for 1.2 h. After heating, the material was cooled and centrifuged to separate the solid and liquid phases. The solid portion was washed using 50 L of clean water, and the solid and liquid phases were further separated by centrifugation. After washing twice, the wet weight of the obtained straw residue was 33.5 kg (8.3 kg dry basis). The dry basis compositions were tested, which contained about 3.6 kg of cellulose, 1.9 kg of hemicellulose, and 2.8 kg of lignin and others.

Step 2-4, the acid hydrolysis was performed and included adding the obtained straw residue into 74.5 kg of $H_2SO_4$ solution with 1.0% concentration, mixing well, placing the solution in the pressure reactor (which is acid and alkali resistant), and heating to 160° C. and keeping for 120 min. After heating, the material was cooled and centrifuged to separate the solid and liquid phases. The weight of the liquid portion was 90.7 kg. After the HPLC test, the xylose concentration was 11.96 g/L, and the purity was 73.23%. The solid portion was washed using 30 L of clean water, and the centrifugation was continued to separate the solid and liquid phases. After washing twice, the wet weight of the obtained acid hydrolyzed straw residue was 18.9 kg (5.6 kg dry basis). The components were tested to contain 3.7 kg of cellulose and 1.8 kg of lignin and others.

Step 2-5, the gradient alkali processing was performed and included adding the acid hydrolyzed straw residue into 23.1 kg process water, adding the 30% concentrated alkali liquid into the mixture, adjusting the initial concentration of NaOH in the system to 0.1%, mixing well, placing the solution in the pressure reactor (which is acid and alkali resistant) (wherein the reactor is connected to a pipeline with a pump and a replenishment bottle to replenish the 30% alkali liquid), setting the initial temperature to 90° C., heating and warm-keeping for 1 h, and adding 30% alkali liquid to make the system NaOH concentration increased by 0.1%, rising the temperature by 20° C., according to this pattern, for every 1 h, increasing the system NaOH concentration by 0.1%, increasing the temperature by 20° C., wherein a total reaction time was 7 h. After heating, the product was cooled and centrifuged to separate the solid and liquid phases. The solid portion was washed using 30 L of water for three times, and then dried in an oven at 65° C. for 20 h, after that, 2.82 kg of dried finished product was obtained and tested, in which the purity of the cellulose was 95.73%.

Embodiment 7 Extraction of High-Purity Xylose Hydrolysate and Cellulose Products from the Corn Straw Step 3-1, raw material screening was performed and included selecting corn straw with a moisture content of 20%.

Step 3-2, the raw material preprocessing was performed and included crushing the corn straw using a pulverizer, selecting particles with a particle size of 60-300 mesh using a sieve, and putting the particles in a blower drying box, and drying at 45° C. for 25 h. As a result, by measuring the moisture, absolutely dry powdered corn straw with a moisture content of 0.5% or less was obtained.

Step 3-3, the alkali processing was performed and included weighing 10 kg of the absolutely dry powdered corn straw, mixing the absolutely dry powdered corn straw with 70 kg process water, adding 30% concentrated alkali liquid into the mixture, adjusting the NaOH concentration of the system to 0.4%, mixing well, placing the solution in a pressure reactor (which is acid and alkali resistant), and heating to 122° C. and keeping for 90 min. After heating, the material was cooled and centrifuged to separate the solid and liquid phases. The solid portion was washed using 50 L of clean water, and the solid and liquid phases were further separated by centrifugation. After washing twice, the wet weight of the obtained straw residue was 31.5 kg (8.1 kg dry basis). The dry basis compositions were tested, which contained about 3.7 kg of cellulose, 1.9 kg of hemicellulose, and 2.5 kg of lignin and others.

Step 3-4, the acid hydrolysis was performed and included adding the straw residue into 72.5 kg of $H_2SO_4$ solution with 1.6% concentration, mixing well, placing the solution in the pressure reactor (which is acid and alkali resistant), and heating to 110° C. and keeping for 120 min. After heating, the material was cooled and centrifuged to separate the solid and liquid phases. The weight of the liquid portion was 88.7 kg. After the HPLC test, the xylose concentration was 11.86 g/L, and the purity was 74.28%. The solid portion was washed using 30 L of clean water, and the centrifugation was continued to separate the solid and liquid phases. After washing twice, the wet weight of the obtained acid hydrolyzed straw residue was 20.9 kg (6.4 kg dry basis) whose components were tested to contain 3.8 kg of cellulose, 0.3 kg of hemicellulose, and 2.3 kg of lignin and others.

Step 3-5, the gradient alkali processing was performed and included adding the acid hydrolyzed straw residue into 28 kg process water, adding the 30% concentrated alkali liquid into the mixture, adjusting the initial concentration of NaOH in the system to 0.5%, mixing well, and placing the solution in the pressure reactor (which is acid and alkali resistant) (wherein the pressure reactor is connected to a pipeline with a pump and a replenishment bottle to replenish the 30% alkali liquid.), setting the initial temperature to 80° C., heating and warm-keeping for 1 h, and adding 30% alkali liquid to make the system NaOH concentration increased by 0.3%, rising the temperature by 15° C., according to this pattern, for every 1 hour, increasing the system NaOH concentration by 0.3%, increasing the temperature by 15° C., wherein a total reaction time was 6 h. After heating, the product was cooled and centrifuged to separate the solid and liquid phases. The solid portion was washed using 3 L of water for three times, and then dried in an oven at 65° C. for 20 h, after that, 2.42 kg of dried finished product was obtained and tested, in which the purity of the cellulose was 98.79%.

The foregoing are only preferred embodiments of the present disclosure, and are not intended to limit the present disclosure, and any modifications, equivalent substitutions, and improvements, etc., made within the spirit and principles of the present disclosure shall be included in the scope of protection of the present disclosure.

Also, the present disclosure uses specific words to describe embodiments thereof, such as "an embodiment," "one embodiment," and/or "some embodiments" means a feature, structure, or characteristic associated with at least one embodiment of the present disclosure. Accordingly, it should be emphasized and noted that the "an embodiment" or "one embodiment" referred to two or more times in different locations throughout the present disclosure do not necessarily refer to the same embodiment. In addition, certain features, structures, or characteristics of one or more embodiments of the present disclosure may be suitably combined.

Similarly, it should be noted that in order to simplify the presentation of the present disclosure, and thereby aiding in the understanding of one or more embodiments of the present disclosure, the foregoing descriptions of embodiments of the present disclosure sometimes group multiple features together in a single embodiment, accompanying drawings, or a description thereof. However, this mode of disclosure does not imply that the objects of the present disclosure require more features than those mentioned in the claims. Rather, claimed subject matter may lie in less than all features of a single foregoing disclosed embodiment.

Some embodiments use numbers to describe the number of components, attributes, and it should be understood that such numbers used in the description of the embodiments are modified in some embodiments by the modifiers "about," "approximately," or "substantially." Unless otherwise noted, the terms "about," "approximately," or "substantially" indicates that a ±20% variation in the stated number is allowed. Correspondingly, in some embodiments, the numerical parameters used in the present disclosure and claims are approximations, which are subject to change depending on the desired characteristics of individual embodiments. In some embodiments, the numerical parameters should consider the specified number of valid digits and employ general place-keeping. While the numerical domains and parameters used to confirm the breadth of their ranges in some embodiments of the present disclosure are approximations, in specific embodiments such values are set to be as precise as possible within a feasible range.

For each of the patents, patent applications, patent application disclosures, and other materials cited in the present disclosure, such as articles, books, specification sheets, publications, documents, etc., are hereby incorporated by reference in their entirety into the present disclosure. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those set forth herein, the descriptions, definitions and/or use of terms in the present disclosure shall prevail.

Finally, it should be understood that the embodiments described in the present disclosure are used only to illustrate the principles of the embodiments of the present disclosure. Other deformations may also fall within the scope of the present disclosure. As such, alternative configurations of embodiments of the present disclosure may be considered to be consistent with the teachings of the present disclosure as an example, not as a limitation. Correspondingly, the embodiments of the present disclosure are not limited to the embodiments expressly presented and described herein.

What is claimed is:

1. A method for extracting xylose liquid and cellulose with high purity from corn straw, comprising:
    step 1, raw material screening including: selecting the corn straw with a moisture content of 7%-13%;
    step 2, raw material preprocessing including: processing the corn straw into powder using a pulverizer, a particle size of the powder being between 60 mesh and 300 mesh, and then putting the powder into a blower drying box and drying at 45° C. for 22 h-26 h to obtain absolutely dry powdered corn straw;
    step 3, alkali processing including: after mixing the absolutely dry powdered corn straw with process water, adding 30% concentrated alkali liquid and adjusting a concentration of NaOH in the system to 0.1%-0.4%, performing the alkali processing for 1.2 h-2.0 h under a temperature of 85° C.-125° C., then obtaining straw residue and a centrifugal clear liquid by centrifugal separation, wherein the straw residue enters a xylose extraction process;
    step 4, acid hydrolysis including: mixing the straw residue with a 1.0%-2.5% dilute $H_2SO_4$ solution in a certain proportion, performing the acid hydrolysis at 100° C.-160° C. for 30 min-120 min, and then performing a centrifugation to obtain an acid hydrolyzed liquid and acid hydrolyzed straw residue, wherein the acid hydrolyzed liquid is a high-purity xylose liquid, and the acid hydrolyzed straw residue enters a following cellulose extraction process;
    step 5, gradient alkali processing including: after mixing the hydrolyzed straw residue and the process water, adding 30% concentrated alkali liquid and adjusting a concentration of NaOH in the system to 0.2%-1%, performing preprocessing continuously for 4.0 h-7.0 h, wherein an initial temperature is 60° C.-90° C., then for every 1 hour, increasing the concentration of NaOH by 0.1%-0.5% and increasing the temperature by 10° C.-20° C., after separating the treated material by centrifugation, washing a solid portion to obtain a high cellulose content product.

2. The method of claim 1, wherein in the step 1, a content of the cellulose in components of the corn straw is 36%-41%, a content of hemicellulose in the components of the corn straw is 19%-24%, and a content of lignin and other substances in the components of the corn straw is 35%-45%.

3. The method of claim 1, wherein in the step 3, for every 100 g of the absolutely dry powdered corn straw after the alkali processing, 83.40 g straw residue is obtained, wherein the straw residue contains 36.98 g cellulose, 18.78 g hemicellulose, and 27.64 g lignin and other substances.

4. The method of claim 1, wherein in the step 4, for every 100 g of the absolutely dry powdered corn straw after the acid hydrolysis, 53.11 g of the acid hydrolyzed straw residue and 1.53 L of xylose hydrolysate are obtained, wherein the acid hydrolyzed straw residue contains 34.32 g of cellulose, 18.79 g of lignin and other substances, and a concentration of xylose in the xylose hydrolysate is 11.84 g/L.

5. The method of claim 1, wherein in the step 5, for every 100 g of the absolutely dry powdered corn straw, 27.37 g of high-purity cellulose is obtained by the gradient alkali processing.

* * * * *